Aug. 9, 1927.
M. BRAY
1,638,318
STEERING GEAR
Filed April 14, 1926
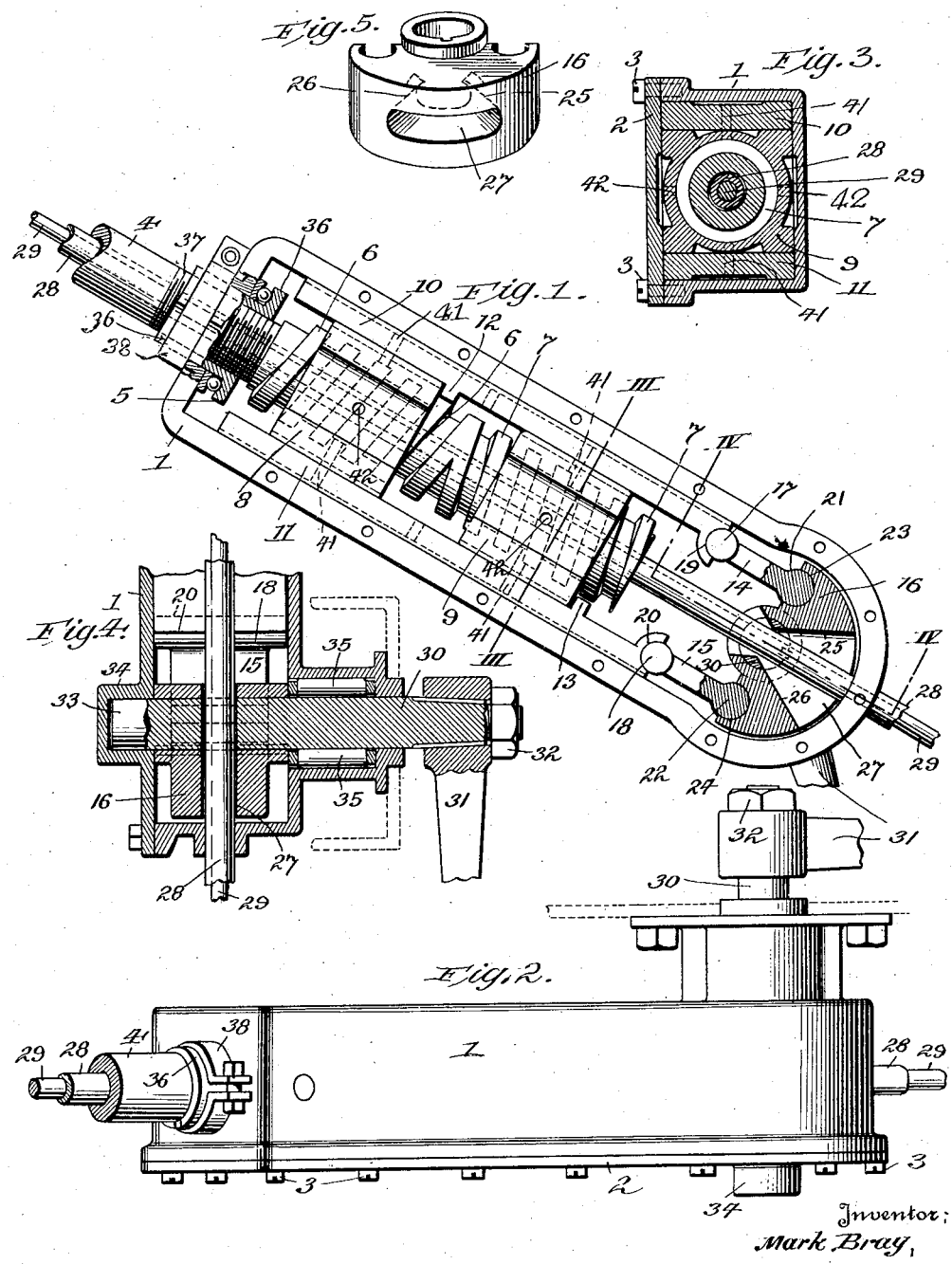
Inventor:
Mark Bray,
By Dodge and Sons,
Attorneys Patented Aug. 9, 1927.

1,638,318

UNITED STATES PATENT OFFICE.

MARK BRAY, OF NEVADA, MISSOURI; GLESSIE BRAY, GUARDIAN OF SAID MARK BRAY, A MENTAL INCOMPETENT, ASSIGNOR OF ONE-HALF TO JOHN C. HOWARD, OF NEVADA, MISSOURI.

STEERING GEAR.

Application filed April 14, 1926. Serial No. 102,006.

My invention relates to certain improvements in steering gear mechanism and especially to that portion of the steering mechanism which actuates what is usually termed the steering arm.

The object of my invention is to provide a steering device of superior strength and durability, exceptional accessibility of interior parts, simplicity of adjustment in case of wear, and at the same time reduce the cost of construction.

The further object of my steering gear mechanism is to construct and arrange the parts in such a manner that the steering wheels may be turned from one extreme to the other with a minimum movement of the steering parts, and positively locked in their adjusted position without unduly straining the parts of the steering mechanism or causing excessive vibration for the steering post while the wheels are passing over obstructions.

In the drawing, Figure 1 is a side elevation of the steering mechanism with the cover removed, some parts being shown in section;

Fig. 2 is a plan view of the device completely enclosed and installed;

Fig. 3 is a cross section on the line III—III of Fig. 1;

Fig. 4 is a section taken on the line IV—IV of Fig. 1; and

Fig. 5 is a perspective view of the rocker actuator.

In carrying out the object stated, I provide a gear casing or housing 1 with a cover 2, which is adapted to be securely clamped by screws 3 to enclose the essential parts of the steering gear.

A hollow steering wheel shaft 4 extends through the ball thrust bearing 5 into the housing 2, and is provided therein with oppositely threaded portions 6 and 7. Upon each of the oppositely threaded portions are nuts 8 and 9 locked against rotary movement, but designed to move in an axial direction on the steering shaft 4.

Between the nuts 8 and 9 and the housing 2 are slides 10 and 11, provided respectively with lugs 12 and 13 adapted to engage the with nuts, to transfer the motion of the nuts by means of a pair of cooperating thrust links 14 and 15 connected at the lower end of the slides to the rocker actuator 16. The thrust links 14 and 15 have rounded end portions 17 and 18 which bear respectively in the socket portions 19 and 20 on the end of the slides 10 and 11. Likewise, the oppositely rounded ends 21 and 22 of the thrust links 14 and 15 bear respectively in the socket portions 23 and 24 of the rocker actuator.

The rocker actuator 16 has portions 25 and 26 cut away to the ends of the slot 27, more clearly shown in Fig. 5, to avoid contact with a second hollow shaft 28 which is housed within shaft 4 and extends therethrough, said shaft 28 being used to control the throttle and enclosing another smaller shaft 29 which regulates the spark.

Referring more particularly to Fig. 4, the rocker actuator 16 is keyed to a rock shaft 30 which extends through the housing 1 and has a steering arm 31 secured thereto by means of a nut 32. The rock shaft 30 has a journal bearing 33 in the offset portion 34 of the housing 1 and is supported between the rocker actuator 16 and the steering arm 31 by means of antifriction roller bearings 35. As shown in Figs. 4 and 5, actuator 16 is extended at its hub to space it from the side walls of housing 1 and thereby reduce the friction between the parts when the mechanism is operated.

The thrust bearing 5 consists of an internally threaded hollow partly split bushing 36 adapted to be adjusted on the screw threads 37 on the shaft 4 and positively locked thereon by an adjustable collar 38. In case of wear of the lugs 12 and 13, the sockets 19 and 20, the slides 10 and 11, the sockets 23 and 24 of the actuator 16, or the rounded bearing portions of the thrust links 14 and 15, may be brought into closer contact to take up the wear by screwing the steering shaft 4 down in the housing 1 and screwing the bushing 36 up against the housing and locking it in that position by the collar 38.

As shown in Fig. 3, the sliding nuts 8 and 9 are square in cross section and are held between the slides to prevent rotation. The corners of the nuts form guides having spaces between them, with oil holes 42, 42 therein extending through four sides of the nuts 8 and 9, to lubricate the threads on the steering shaft 4 said spaces permitting the oil to come between the nuts and the slides, to facilitate the movement of the latter. Oil holes 41, 41 in slides 10, 11 provide for lubrication between the slides and the walls of casing 1.

In operation by the rotation of the steering shaft 4, the nuts 8 and 9 which are oppositely threaded are caused to move either toward or away from each other. In the former case the nut 8 engages the lug 12 to move the slide 10 downward, while in the latter, the nut 9 engages the lug 13 to move the slide 11 downward. In either case the downward thrust of one of the slides is transmitted by one of the thrust links 14 or 15 to the rocker actuator 16 which is forced down on one side and up on the other side thereby forcing the idle slide upward and vice versa. The oscillation of the rocker actuator 16, causes the movement of the rock shaft 30 which in turn imparts the desired motion to the steering arm 31 attached to the end of the rock shaft.

While I have described my preferred form of steering gear, I do not wish to confine myself to this particular form or arrangement of parts except as hereinafter limited by the appending claims.

What I claim as my invention is:

1. A steering gear mechanism comprising a steering shaft with oppositely threaded portions; a nut mounted on each of said portions; a pair of slides; a lug on each of said slides adapted to engage one of said nuts; a rocker actuator; means for transmitting the thrust of the slides to the actuator; and a steering arm connected to said actuator.

2. A steering gear mechanism comprising a casing a steering shaft with oppositely threaded portions; a nut mounted on each of said portions; a pair of slides mounted between the nuts and the casing; a lug on each of said slides adapted to engage one of said nuts; a rocker actuator; means for transmitting the thrust of the slides to the actuator; and a steering arm connected to said actuator.

3. A steering gear mechanism comprising a casing a steering shaft with oppositely threaded portions; a nut mounted on each of said portions; a pair of slides mounted between the nuts and the casing; a lug on each of said slides adapted to engage one of said nuts; a rocker actuator; and thrust links for transmitting the movement of said slides to the actuator and a steering arm connected to said actuator.

4. In a steering gear mechanism the combination of a housing; a steering shaft extending therein with oppositely threaded portions; a nut mounted on each of said portions; a rocker actuator; a pair of slides; a lug on each of said slides adapted to cooperate with one of the nuts; and thrust links respectively connecting said slides at their lower ends to opposite sides of the actuator; and a steering arm connected to said actuator.

5. In a steering gear mechanism the combination of a housing; a steering shaft extending therein with oppositely threaded portions; a nut mounted on each of said portions; a rocker actuator; a pair of slides guided between the housing and the nuts; a lug on each of said slides adapted to engage one of said nuts; and thrust links respectively connecting said slides at their lower ends to opposite sides of the actuator; and a steering arm connected to said actuator.

6. In a steering gear mechanism the combination of a housing; a steering shaft with oppositely-threaded portions extending within the housing; a nut mounted on each of said portions; a pair of slides each having a lug adapted to cooperate with one of said nuts; a rocker actuator; a rock shaft carrying the rocker actuator, said rocker actuator being provided with integral projecting hub extensions for spacing the actuator from the walls of the housing; thrust links connecting said slides to opposite sides of the actuator; and a steering arm mounted on the rock shaft.

7. A steering gear mechanism comprising a housing; a steering shaft with oppositely threaded portions located within the housing; a nut mounted on each of said threaded portions; a pair of slides mounted between the nuts and the housing, each of said slides having a lug adapted to engage one of said nuts; a rocker actuator mounted in the housing; means for transmitting the thrusts of the slides to the actuator, said nuts being provided with passages for the entrance of a lubricant between the nuts and the slides and between the nuts and said threaded portions on the steering shaft; and a steering arm connected to said actuator.

8. A steering gear mechanism comprising a housing; a steering shaft with oppositely threaded portions located within the housing; a nut mounted on each of said threaded portions; a pair of slides mounted between the nuts and the housing, each of said slides having a lug adapted to engage one of said nuts; a rocker actuator mounted in the housing; means for transmitting the thrusts of the slides to the actuator, said nuts and slides being provided with passages for the entrance of a lubricant between the nuts and the slides, between the nuts and the threaded portions on the steering shaft and between the slides and the housing; and a steering arm connected to said actuator.

In testimony whereof I have signed my name to this specification.

MARK BRAY.